Sept. 14, 1965  J. W. HENRY  3,205,619
IRRIGATING MULCHING SHEET

Filed Nov. 1, 1963  2 Sheets-Sheet 1

JAMES W. HENRY
INVENTOR.

BY R. Frank Smith
Thomas W. O'Rourke

ATTORNEYS

United States Patent Office 3,205,619
Patented Sept. 14, 1965

3,205,619
IRRIGATING MULCHING SHEET
James W. Henry, Kingsport, Tenn., assignor to Eastman Kodak Company, Rochester, N.Y., a corporation of New Jersey
Filed Nov. 1, 1963, Ser. No. 320,893
5 Claims. (Cl. 47—9)

This invention relates to a plastic mulching structure and more particularly to a mulching structure having integral irrigating means permitting more economical use of available water while improving ease of installation and stability of the structure.

Previous use of plastic mulching has shown great promise when used in the cultivation of crops in areas where water is scarce as well as in more conventional uses where it enhances the yield of crops under more favorable climatic conditions. Conventional plastic mulching is merely a thin, transparent or translucent thermoplastic pliant sheet which is spread over the area under cultivation. Often the sheet is in the form of long strips having holes provided therein through which the desired vegetation can grow. Since such large areas of thin sheet are easily blown by the wind, it is a common practice to bury the edges of the sheet to reduce the access of wind to the volume under the sheet and to provide anchored portions to stabilize the sheet against displacement.

Several advantages accrue from the use of plastic mulching. Growth of undesirable vegetation which competes with the cultivated crop for moisture and nourishment is curtailed significantly as a result of the selective placement of the holes in the mulching. These holes are provided only in the vicinity in which the cultivated plantings grow. Also, a blanket of air is trapped under the mulching. Though of course there is some interchange between the air under the mulching and that in the normal atmosphere, the air under the mulching is a substantially stable and distinct volume. This enables heat from solar sources to be concentrated in the air under the mulching rather than dispersed throughout the atmosphere. Early germination and accelerated growth are promoted by the resulting higher temperatures under the mulching.

Even more important in arid areas is the limited capacity of the air under the mulching to hold large quantities of moisture. Thus the trapped air quickly becomes laden with moisture and conserves the moisture in the soil. It has been established that the prevention of loss of water through evaporation is accomplished to a large degree by plastic mulching.

As a result of earlier crops and greater yield which have been realized through the use of such mulching, some commercial use is currently being made of such sheets despite the cost of the mulching—which is usually burned after a single use—and the relatively high cost of burying the edges while laying the mulching edges in the fields.

Certain other difficulties have also restrained the use of plastic mulching. In arid areas, water is available only through expensive irrigation techniques. Irrigation water is often conducted to the fields in pipes and dispersed by means of sprinkling systems. This is particularly true of the carefully cultivated vegetation with which plastic mulching is advantageously used. Unfortunately, the mulching serves not only as a vapor barrier to preserve moisture in the soil, but also as a water-proof covering which prevents irrigation water from reaching the plants. Water which is sprinkled onto the plastic mulching frequently forms pools of water thereon and is lost entirely through evaporation, or flows to the uncovered area between the rows of plants where it is absorbed in the soil and reaches the plants only through an inefficient diffusion process. Obviously plastic mulching is of little value to preserve soil moisture when the greater part of the water is dispersed in the uncovered portions of the soil. The small amounts of water which would be admitted through the plant holes of the mulching clearly would be of little consequence.

It is therefore an object of this invention to provide the plastic mulching structure which can be easily and securely positioned in the field.

Another object of this invention is to provide a plastic mulching structure to efficiently distribute irrigation water.

Other objects of the invention will be apparent from the following description of the invention.

According to the present invention, a plastic mulching sheet is provided with an attached conduit having perforations therethrough in only a selected area. The conduit runs through the sheet and is employed to conduct irrigation water and/or liquid fertilizer to the plants. As a result of the added water and material defining the conduit, additional ballast is added to the sheet to secure it in place thereby obviating the need to bury the edges of the sheet. Perforations are provided in the underside of the conduit and irrigation water is therefore supplied only to the desired protected area under the mulching sheet.

The perforations may be of any size for practical dispersal of water. In one preferred embodiment of the invention the perforations are of such small dimensions that water can be maintained in the conduits under relatively low pressure with continuous and substantially equal dispersal along the length of the conduit. It would ordinarily be unacceptable to meter the irrigation water in such small amounts by conventional means because of extreme losses through evaporation. However, as a result of the substantially water-saturated air under the mulching sheet of the present invention, it is possible to constantly maintain water in the conduit for ballast to anchor the sheet while maintaining ideal moisture conditions under the sheet without undue losses through evaporation.

In yet another embodiment of the invention, the perforations increase in size along the length of the conduit. This embodiment is advantageously used for intermittent relative high-pressure distribution of irrigation water. Under such conditions, water pressure decreases at positions more remote from the water pump or other pressure source, but the larger perforations at the more remote positions tend to equalize the amounts of water passing through the perforations at the various positions along the conduit.

A preferred configuration of the present invention is one in which a conduit is attached to each of the two longer edges of a strip of plastic mulching sheet. In this embodiment the perforations are preferably placed in the lower inside quadrants of the conduits, or in a similar area if the conduits are other than circular.

The invention will be more clearly understood with reference to the following figures in which.

Figure 1:
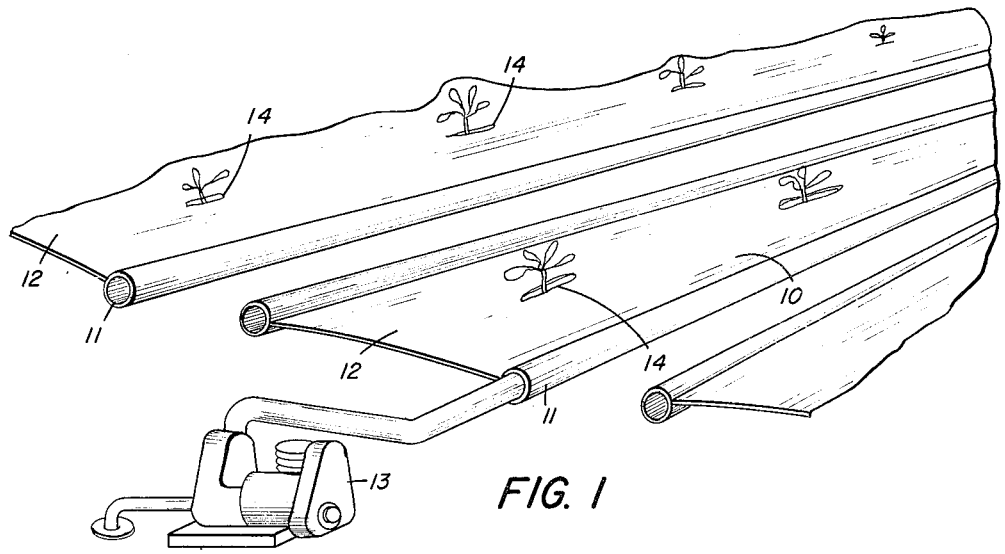
FIG. 1 is a prospective view of one utilization of the irrigating plastic mulching sheet.

Referring to FIG. 1, irrigating plastic mulching sheet 10 is shown as comprising sheet 12 with conduits 11 attached to each edge thereof. Slits 14 are provided in sheet 12 to allow the cultivated vegetation to grow therethrough. A source of water under pressure such as pump 13 is provided to deliver water through one or more of conduits 11. It is contemplated that a distribution manifold be used to deliver water from pump 13 to each of conduits 11, or all or part of the conduits 11 may be connected in series. Those skilled in the art will readily recognize the most expedient and efficient arrangement under the circumstances in a specific situation.

Figure 2:
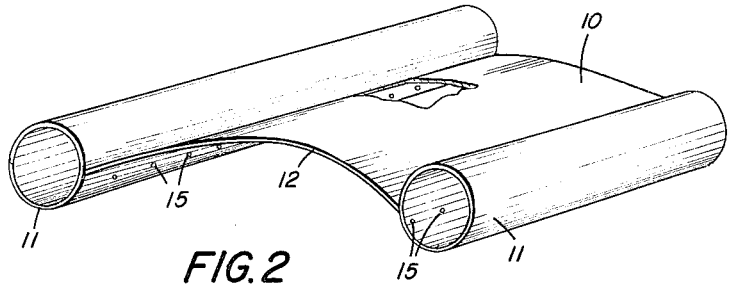
FIG. 2 is a more detailed prospective view of the prefered embodiment of the irrigating plastic mulching sheet shown in FIG. 1.
Figure 3:
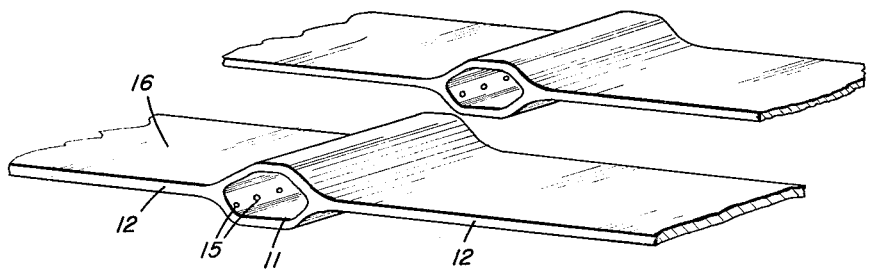
FIG. 3 is a prospective view of a different embodiment of the irrigating plastic mulching sheet structure.

The irrigating plastic mulching sheet 10 is shown in more detail in FIG. 2 wherein it is evident that perforations 15 are disposed in conduit 11 so that substantially all of the water supplied will be dispersed under sheet 12. While irrigating plastic mulching sheet structure 10 is the preferred embodiment of the invention, mulching sheet 16 shown in FIG. 3 has many of the advantages of the preferred embodiment but enables conduit 11 with perforations 15 to be placed more centrally in respect to sheet 12 so that water can be dispersed immediately adjacent the cultivated planting. It is to be understood, of course, that a composite structure having the edge conduits of FIG. 2 and the central conduit of FIG. 3 would, in some instances, have advantages over the illustrated structures.

Figure 4:
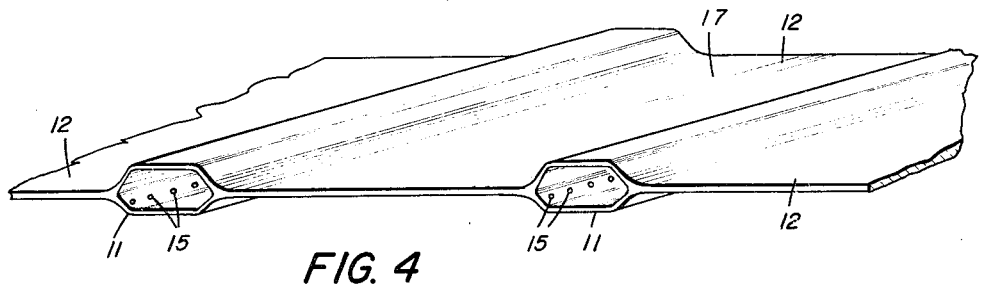
FIG. 4 is a prospective view of yet another embodiment of the irrigating plastic mulching sheet structure.

Irrigating plastic mulching sheet structure 17 as shown in FIG. 4 is yet another embodiment in the invention wherein conduits 11 with perforations 15 are disposed in sheet 12 with the spacing between conduits 11 and from the edges of sheet 12 being substantially equal.

Sections of the irrigating plastic mulching structure of the present invention can be connected together by any of the many conventional means such as inserting a short length of pipe into the conduits of the structures to be connected and clamping the sheet securely around the pipe.

The irrigating plastic muching structure can be produced by extruding the sheet with integral conduits therein, or by attaching a conventional mulching sheet strip to conduits in various forms. A large number of polymeric thermoplastics can be extruded into sheets. The polyolefins such as polyethylene or polypropylene are perhaps the better known of the sheet forming polymers, but those skilled in the art will recognize that many materials are suitable for forming into sheets. Even a greater number of materials are suitable for forming the conduit structure of the present invention. Those skilled in the art will readily realize whether the conduit structure can be more advantageously constructed of the same material as the sheet, or of a differing material.

The invention has been described in detail with particular reference to preferred embodiments thereof, but it will be understood that variations and modifications can be effected within the spirit and scope of the invention as described hereinabove and as defined in the appended claims.

I claim:
1. A plastic irrigating mulching sheet structure comprising a polymeric pliant sheet with at least two opposite edges having attached thereto at least one coextensive tubular structure defining a conduit, said tubular structure having perforations underlying said sheet and defined in said conduit.

2. An irrigating plastic mulching sheet structure as set forth in claim 1 having two tubular structures, one of said tubular structures being disposed on each of two opposite edges of said sheet.

3. An irrigating plastic mulching sheet structure as set forth in claim 1 in which the tubular structure is circular in cross section.

4. An irrigating plastic mulching sheet structure comprising a light transmitting polymeric sheet having disposed therethrough at least one hollow structure defining a conduit, said conduit being substantially in the plane of said sheet and having perforated portions disposed only on one side of the plane of said sheet.

5. A mulching sheet structure comprising a pliant mulching sheet having at least one coextensive, perforated conduit defined therein, the perforations in said conduit being disposed on one side of said sheet.

References Cited by the Examiner

UNITED STATES PATENTS

| | | | |
|---|---|---|---|
| 2,822,769 | 2/58 | Green | 111—7.1 |
| 2,883,676 | 4/59 | Kwake | 4—172 |
| 3,005,287 | 10/61 | Dudley | 47—25 |

OTHER REFERENCES

How to Use Polyethylene Film on Your Farm, Monsanto Chemical Co., Plastics Div., Springfield, Mass., October 1959. Page 14 relied on.

ABRAHAM G. STONE, *Primary Examiner.*